April 29, 1924.
W. H. FULTON ET AL
1,492,076
METHOD FOR MAKING TUBES
Original Filed March 8, 1917   4 Sheets-Sheet 1
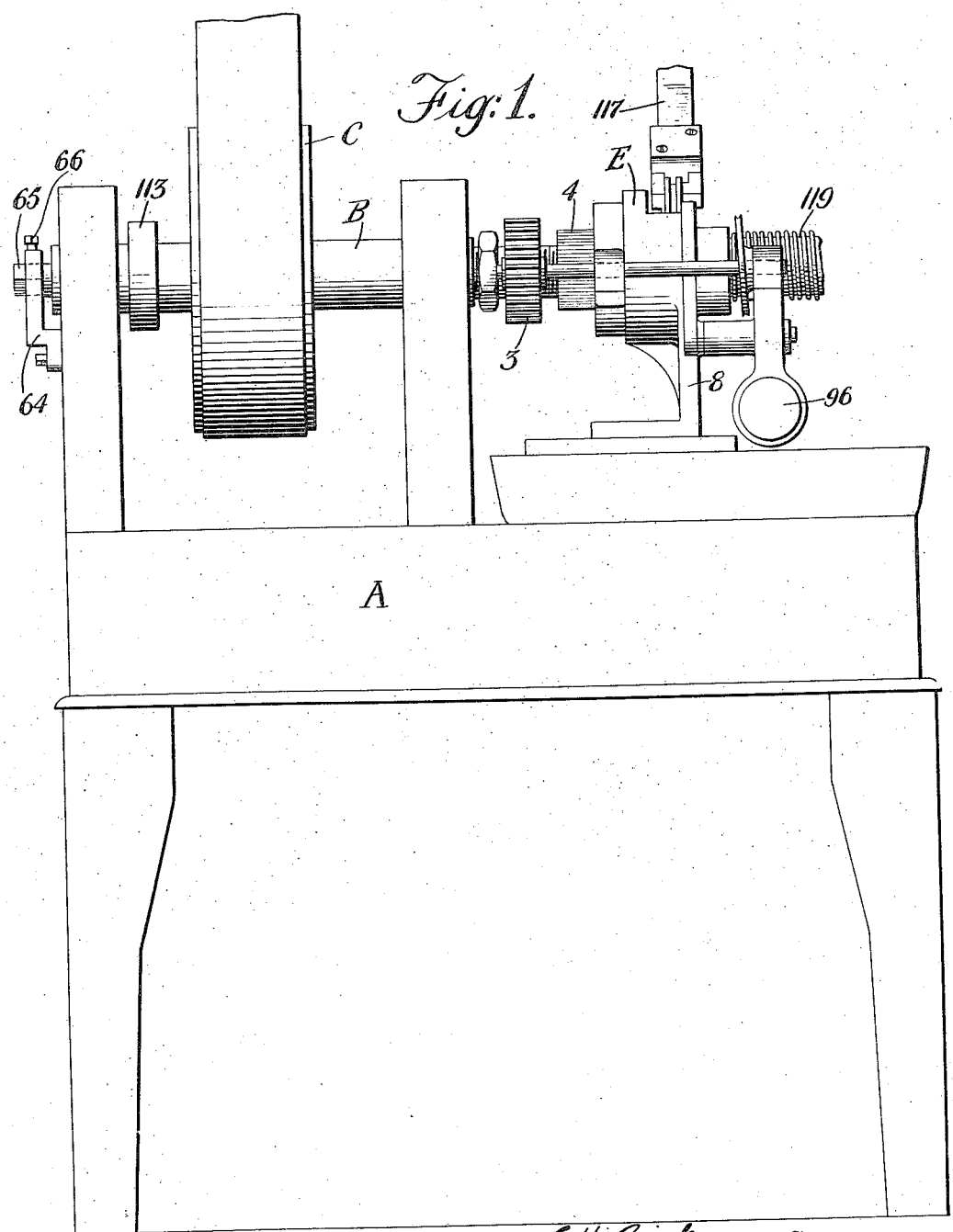

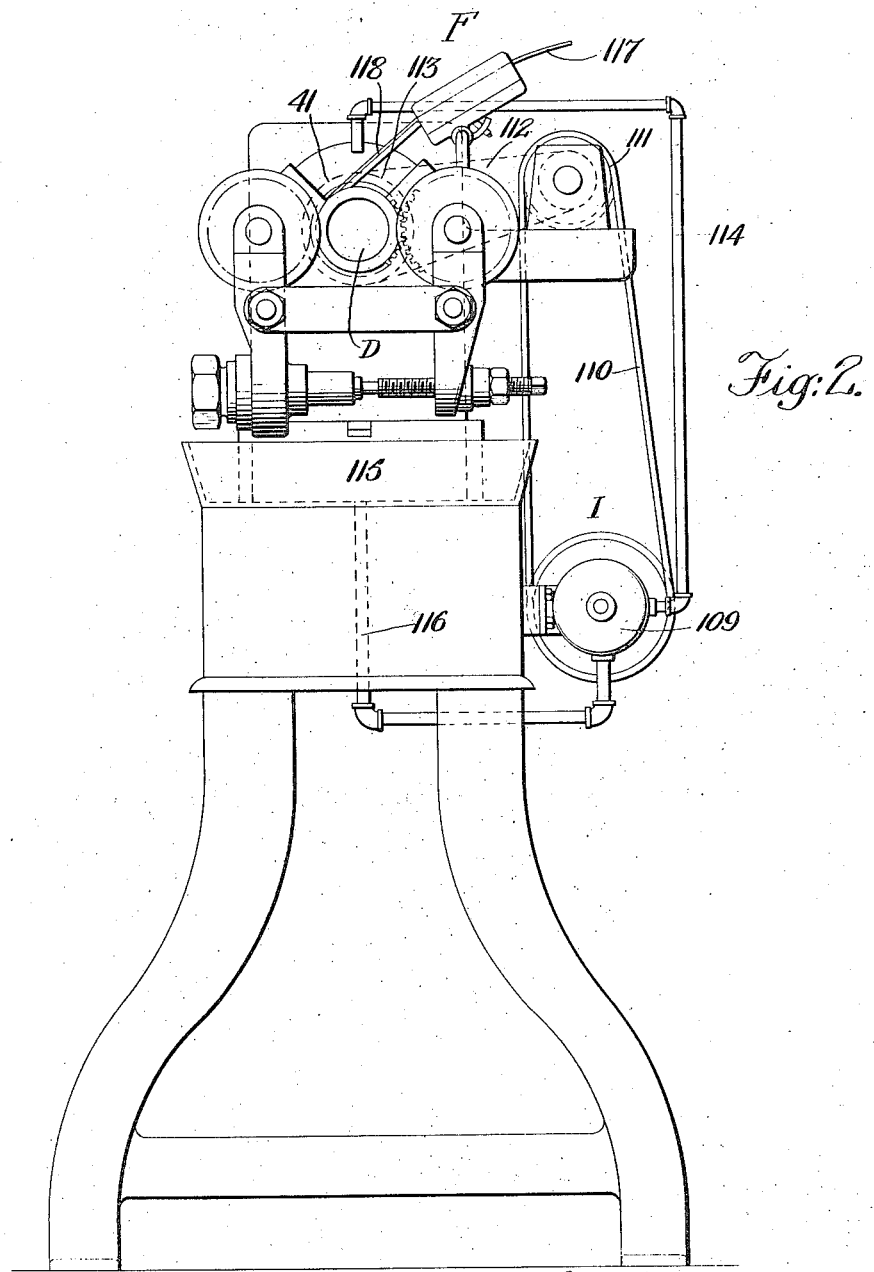

April 29, 1924.
W. H. FULTON ET AL
METHOD FOR MAKING TUBES
Original Filed March 8, 1917    4 Sheets-Sheet 3
1,492,076
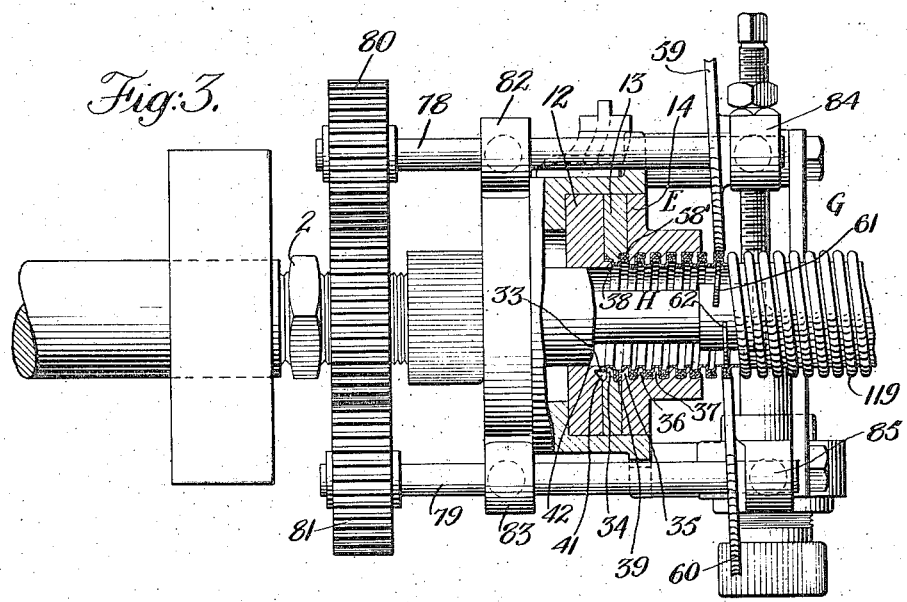
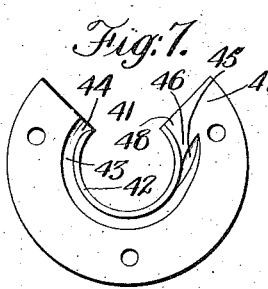
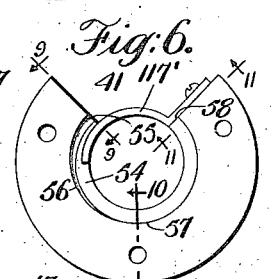
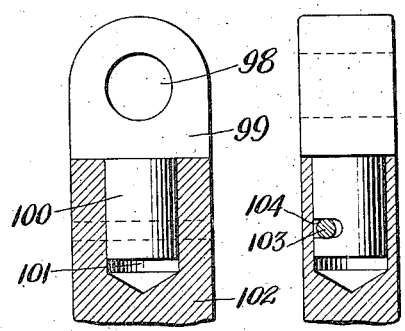
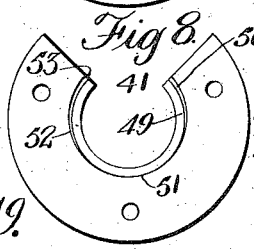
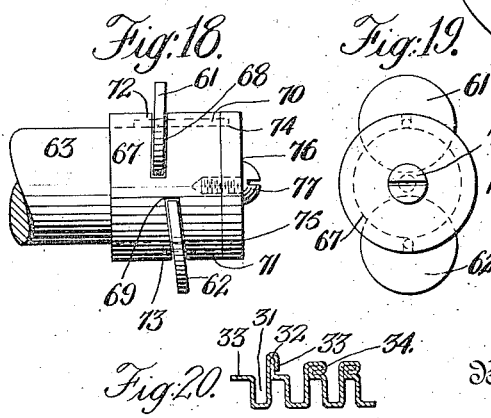
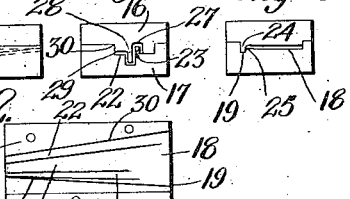

Patented Apr. 29, 1924.

1,492,076

UNITED STATES PATENT OFFICE.

WILLIAM H. FULTON, OF IRVINGTON, LOUIS H. BRINKMAN, OF GLEN RIDGE, AND HERMAN SHELLMER, OF NEWARK, NEW JERSEY, ASSIGNORS TO TITEFLEX METAL HOSE CORPORATION, A CORPORATION OF NEW YORK.

METHOD FOR MAKING TUBES.

Original application filed March 8, 1917, Serial No. 153,262. Divided and this application filed November 21, 1919. Serial No. 339,663.

*To all whom it may concern:*

Be it known that we, WILLIAM H. FULTON and LOUIS H. BRINKMAN, citizens of the United States of America, and HERMAN SHELLMER, a subject of the King of England, residing at Irvington, county of Essex, and State of New Jersey, Glen Ridge, county of Essex, and State of New Jersey, and Newark, county of Essex, and State of New Jersey, respectively, have invented new and useful Improvements in Methods for Making Tubes, of which the following is a specification.

This invention relates to methods for forming tubes of strip and particularly flexible tubes having fixed joints between adjacent convolutions and a groove extending longitudinally of the strip, although not limited thereto.

This application is a division of our prior application Serial Number 153,262 filed March 8th, 1917.

One object of the invention is to provide an improved method of forming a tube seam.

A further object of the invention is to provide a continuous process of forming the tube.

A further object of the invention is to provide a process for forming a tube which does not require reverse bending of the metal.

Other and ancillary objects of the invention will appear hereinafter.

In the accompanying drawings which illustrate the invention—

Fig. 1 is a side elevation of the machine whereby the method may be carried out, and a portion of the exterior of a tube formed thereby;

Fig. 2 is an end elevation of the machine looking from the right hand of Fig. 1 and showing a lubricating fluid circulating system which has been omitted from Fig. 1 for the sake of clearness;

Fig. 3 is a top plan view, partially in section, on an enlarged scale, of a portion of the apparatus of Fig. 1, the tube being shown in exterior view and also in longitudinal section;

Figs. 6, 7 and 8 are side views of die sections;

Fig. 9 is a face view of two of the die sections looking at the strip entrance face on the line 9—9 of Fig. 6;

Fig. 10 is a section on the line 10—10 of Fig. 6;

Fig. 11 is a section on the line 11—11 of Fig. 6;

Fig. 12 is a side elevation of the preliminary former;

Fig. 13 is an end elevation of the apparatus of Fig. 12 at the exit end;

Fig. 14 is an end elevation of the former at the entrance end;

Fig. 15 is a top plan view of the bottom portion of the preliminary former as shown in Figs. 12–14 inclusive;

Fig. 16 is a side elevation partly in section of a bearing;

Fig. 17 is a view partly in section of the device of Fig. 16; Fig. 17 being in a plane 90° removed from Fig. 16;

Fig. 18 is an elevation of the internal rollers supporting the tube from the interior during the spinning operation;

Fig. 19 is an end elevation of the apparatus of Fig. 18; and

Fig. 20 is an enlarged fragmentary section of the tube strip as it appears in the first few turns of its formation and illustrating the progress of formation of the strip as received from the preliminary former into the tube which is subsequently passed under the spinning rolls.

Figure 4:
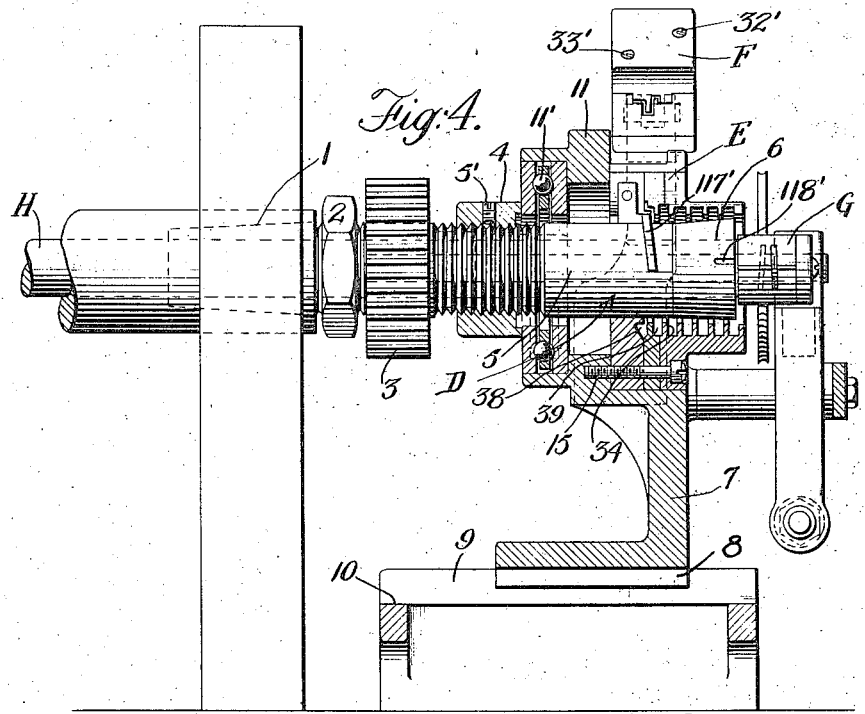
Fig. 4 is a side elevation of the apparatus of Fig. 3, partially in section, but with the tube removed.
Figure 5:
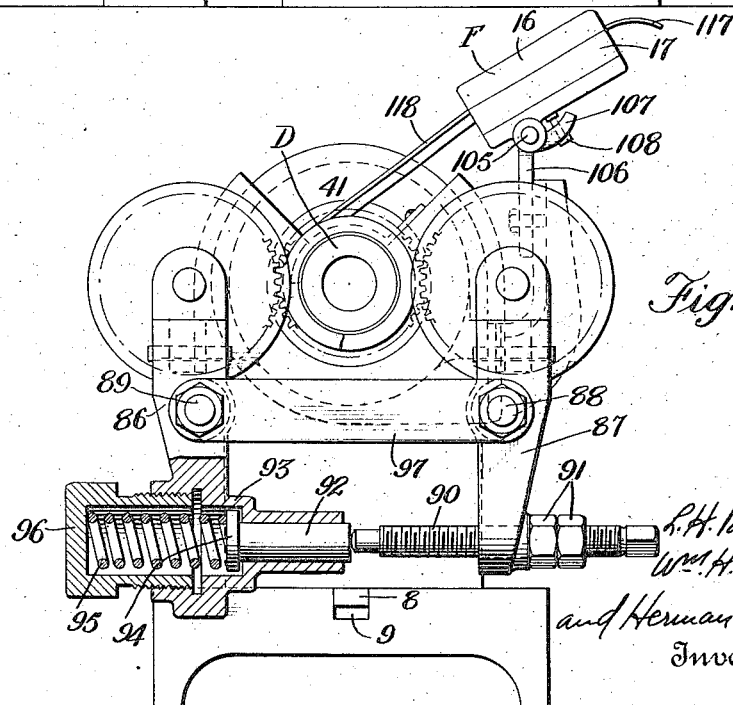
Fig. 5 is an end elevation of the apparatus of Fig. 4 looking from the right of that figure.

Referring to the drawings, the apparatus comprises a suitable frame A on which is rotatably mounted a hollow spindle B driven by any suitable means as for instance a belt pulley C. Secured to the spindle B is a hollow arbor or mandrel D about which the tube strip is wound, and surrounding the arbor is a die E, for forming the strip into the tube, receiving the strip from a preliminary former F. Also mechanism G is provided for spinning and compacting the seam, the inner support being carried at the end of a rod H extending through the mandrel or arbor. A circulating system I for lubricating liquid may be supplied.

With this general survey, the drawings may now be referred to more in detail. The mandrel D may be secured in driving relation to the rotating spindle by driving its conical end 1 into a conical socket in the spindle, this being a well known manner of forming driving connections. It is employed in securing the tools of milling machines to the driving spindles and in numerous other well known applications. To remove the mandrel D, the nut 2, which is screw threaded on the arbor, may, by turning, be forced against the end of the spindle and so forcibly withdraw the end of the mandrel from its socket.

Fixed upon the arbor is a spur gear 3 for driving the spinning rollers as will be hereinafter referred to. An abutment nut 4 for limiting the movement of the die is in screw threaded engagement with the arbor so that it may be adjusted and it may be secured in any adjusted position by a set screw 5'. The arbor has a smooth unthreaded surface 5 which is cylindrical and of substantially uniform diameter while the surface 6 also smooth, is tapered, the diameter growing larger toward the right (see Fig. 4). A die for forming the tube from the strip is carried on the support 7 which may slide upon the frame longitudinally of the arbor but is prevented from turning about the arbor axis by means of a projection 8 having an easy running fit within the slot 9 in the supporting frame. By making the projection 8 of suitable length, as shown, turning of the die structure about a vertical axis, if there should be any such tendency, is prevented. The support 7 carries a frame 11 for the die which at one side is adapted to abut against the nut 4, ball bearings 11' serving to permit relative turning of the arbor and die with a reduced amount of friction. On the other side of the die frame, forming channels for the tube are constructed of a number of segmental sections 12, 13, and 14, which are secured together and to the die frame by screws 15.

The preliminary former (see particularly Figs. 12 to 15, inclusive) comprises an upper member 16 and a lower member 17. The lower member 17 has at the end for receiving the flat ribbon, a broad shallow channel 18 with a tapering channel 19 at one side. The channel 18 gradually develops into an intermediate channel 20 which becomes deeper as the exit end is approached and has upon one side the warped wall 21 and upon the other side a shoulder 22. Also the channel 19 gradually broadens and there is a shoulder or rib 23 between the channels 19 and 20. The member 16, proceeding from the receiving end, has the rib or projection 24 which extends within the channel 19 causing a downward bending of the edge of the ribbon at 25. The rib 24 gradually broadens out, keeping in contact with the ledge 26 throughout its length and following along the rib 23 with clearance substantially equal to the thickness of the ribbon. The groove 27 in the upper portion of the former receives the rib 23 and within the groove 20 extends a projection 28 which has a clearance about it substantially equal to a thickness of the ribbon. A right angled shoulder 29 has between it and the shoulder 22 a clearance substantially equal to a thickness of the ribbon and abuts against the shoulder 30 of the section 17. It will thus be seen that the sections are held in properly adjusted lateral position by engagement of shoulders on the two sections; and that the flat ribbon entered within the end of the former as shown in Fig. 14 will gradually have its section changed so that it has a groove longitudinally of the strip, one side bent at a right angle and the other having a double bend so as to form a channel. This conformation is clearly shown in Fig. 20 wherein the groove is shown at 31. The ribbon of this section is then fed into the die about the arbor.

The preliminary former has its two halves secured together by screws as 32' and 33', and the upper and lower sections may be forced more or less tightly together so as to cause more or less of a frictional gripping on the strip by adjusting the screws. The former is pivotally supported at 105 upon a supporting member 106 secured to the forming die. The support 106 carries the curved arm 107 carrying a screw 108 by which the former may be adjusted about the pivot 105 and secured in adjusted position.

When the die sections 12, 13 and 14 are secured in place there is formed a structure having helically arranged ribs or thread segments 34, 35, 36, 37, etc., having bending channels 38 and 39 at the bases of the threads. The bending channel 38 is of a form at the beginning as shown in Fig. 9 gradually merging into a double right angled section as shown in Fig. 11. The die is cut away at 41 to permit the entrance of the strip into the die and at the exit of the bending channel 38 into this recess it is of the double right angled section as referred to. Simultaneously with the entry of the strip portion 33 into the bending channel 38 of the die the other edge of the strip, having the channeled portion 32, enters into the channel 39 and receives within it the radially extending flange 33 of the adjacent edge of the preceding convolution. As the two edges thus proceed around the die they are bent over into the interfolded position as shown at 34 and in this condition emerge from the die channel into the recess 41. The interfolded portions then enter into the helical channel between the threads 35 and 36 and progress helically through succeeding helical channels until discharged from the die. During the passage of the strip through the die the ribs referred to enter within and substantially fill the groove 31 in the strip.

The structure of the sections 12, 13 and 14 is shown more in detail in Figs. 6 to 11 inclusive. Looking at the section 12 from the right of Fig. 3, it comprises (see Fig. 7) a circular flange or projection 42 radially outside of which is a groove 43 adapted to receive the right angled portion 33 from the preliminary former at its intake end 44. As the groove 43 progresses about the die it has, near its other end, a sloped surface 45 which gradually causes the groove to become less and less deep and turns the edge of the ribbon outwardly until at 46 the groove merges into the plane face 47 so that the edge of the ribbon is bent into a radial position forming a right angled bend between the outer face of the flange 42 and the face 47 at the exit end 48.

In Fig. 8 the face of section 13 looked at from the left of Fig. 3 is shown to have at its intake end the channel having the plane face 49 between which and the projection 42 is a clearance for one thickness of ribbon, 50 being the sloping bottom of the channel. This sloping bottom gradually becomes right angled at 51 and the circumferential recess 52 is circumferentially tapering, being small at its beginning and having its largest size 53 at the exit end of the section. This recess is for receiving the strip edge turned up by the sloping surface 45. It will appear that when the two section faces as shown in Figs. 7 and 8 are placed together the channel 38 will be formed between them which at the beginning is as shown in Fig. 9 and at the end as shown in Fig. 11. Looking at the face of the section 13 from the right of Fig. 3, (see Fig. 6) the channel having a bottom 54 is of a height at its intake end as shown at 55. The side 56 of the groove, however, is warped, the groove gradually contracting in radial width until it merges with a perpendicular wall at 57, the groove being substantially rectangular from this point to the exit at 58.

The opposite side of the channel from the bottom 54 is formed by the adjacent edge of the section 14. The result of this structure is to cam the convolution edges 32 and 33 over into the position as shown at 34 (see Fig. 20). The side of the section 14 is cut away at 58' to accommodate the interfolded seam as thus bent down. The remaining channels are in the section 14 and are of uniform cross section, the desired interfolding having taken place. The additional threads are what have been termed "stripping" threads inasmuch as they are concerned with the progress of the tube along the mandrel as distinguished from the preceding thread sections which are concerned in bending and interfolding the strip.

An arc shaped finger 117' extends within the channel 39 at its intake and this finger is stationary, being secured to the die as shown, and supports the strip in the channel and gives the desired curvature to the entering strip. Otherwise the tension on the entering strip and the fact that it is straight would cause it to fail to conform to the shape of the channel so that the tube would not be perfect.

After leaving the die, the tube encounters the spinning rolls 59 and 69 which bear upon the exterior of the seam and are grooved to conform to the desired exterior of the tube. The seam beneath the spinning rolls is supported upon the inside by rolls 61 and 62 rotatably mounted in a rod 63 which extends through the interior of the mandrel and spindle and is secured in a bracket 64 fixed to the end of the frame. Turning of the rod 63 may be prevented by making its end 65 square and entering it within a square hole within the bracket. It may be also secured by a set screw 66. As shown most clearly in Figs. 18 and 19 the rolls 61 and 62 may be mounted in a head 67 fixed to the end of the rod 63. This head is provided with radial slots 68 and 69 for receiving the rolls which are rotatably mounted on the pins 70 and 71 having their ends inserted in sockets 72 and 73 in the head 67, the other ends being inserted in sockets 74 and 75 in the cap plate 76 secured to the head 67 by a screw 77. Between the slots 68 and 69 and the end of the head 67 are circumferentially opening slots for receiving the pins 70 and 71. When therefore the plate 76 is removed, the outer ends of the pins may be lifted and the pins withdrawn from the sockets 72 and 73 to remove the rolls, while they can be inserted by a reverse operation.

The rolls 59 and 60 are fixed upon shafts 78 and 79 to which also are fixed the gears 80 and 81 meshing with the gear 2. This gearing is made of such ratio that the peripheral speed of the rolls 59 and 60 is faster than the speed of the seam with which they engage. About 20% faster has given good results. It will also be observed that the peripheries of the rolls adjacent the seams move in the same direction as the portions of the seam with which they engage. The result of this is that the metal of the seam is spun and forced into most intimate and compact relation. The shafts 78 and 79 are rotatably mounted in bearings 82 and 83 supported from the die frame and also in bearings 84 and 85 mounted in the ends of arms 86 and 87 pivoted to the die frame at 88 and 89. In the lower end of the arm 87 is screw threaded an adjustable screw 90 which may be locked in position by jam nuts 91 and at its inner end bears upon a plunger 92 slidable in a casing 93 fixed to the lower end of the arm 86. Bearing against the head 94 of the plunger is a spring 95 secured by an adjustable cap 96 which is screw threaded into the case and places a greater or less tension upon the spring according to whether it is screwed into the casing more or less. A strengthening bar 97 may extend between the extremities of the pivot pins 88 and 89. It will be seen that this arrangement forces the rolls 59 and 60 yielding against the seam with a pressure which may be determined by the adjustment of the screw or the cap 96 or both. The bearings 82, 83, 84 and 85 are so constructed so as to permit the slight turning necessary to adjustment of the rolls 59 and 60, the clearance which usually exists between the spur gears being sufficient to permit such adjustment so far as the gears 80 and 81 are concerned. These bearings may be of the forms shown in Figs. 16 and 17 wherein 98 is the hole through which the shaft extends, the head 99 in which this hole is made being formed integrally with a cylindrical plug 100 which extends into and is adapted to turn in a cylindrical socket 101 in the support 102. The plug is prevented from withdrawl from the socket by means of a pin 103 which extends through the walls of the socket and through a slot 104 cut in the side of the plug. It will be noted that the pin fits loosely in the slot so that a limited turning movement of the plug in the socket is permitted.

A rotary pump 109 may be driven by a belt 110 from a pulley 111 which, in turn, is driven by a belt 112 from the pulley 113 on the spindle B. This pump may force lubricating fluid through the pipe 114 into the recess 41 of the forming nut onto the work so as to lubricate the same. The drippings will fall into the pan 115 on the frame from which they may be drawn through the pipe 116 into the pump 109. Thus a continuous circulation is effected.

In the operation of the apparatus to form a tube, the end of a flat metal ribbon as shown at 117 of the desired width and thickness is passed through the preliminary former F, emerging therefrom with a section conforming to the section of the channel at its exit as shown in Fig. 13, the strip section being as shown in Fig. 9. The die is pushed to the right (see Fig. 4) and the end of the strip is inserted in the slot 118'. The strip may also be shaved off at its sides to narrow it so that it will be easily threaded through the die. The mandrel is then turned and the strip is inserted in the die with its edges inserted in the channels 38 and 39 of the die and with its central portion about the thread 34, 118 indicating the strip as it passes from the former to the die. The turning of the mandrel then winds the strip about it, drawing it in through the former and the die channels. The strip thus secured to the mandrel, acts as a thread with which the die cooperates after the manner of a nut. The latter is thus forced to the left (see Figs. 3 and 4) until it comes against the nut 4. The die is now in its normal operating position.

The taper of the portion 6 is only a few thousandths of an inch and is for the purpose of insuring a pressure against the inside of the tube so as to produce the friction necessary to cause the strip turns to be bound tightly to the mandrel so that there will be a torsional frictional grip on the strip. The diameter of the cylindrical portion 5 of the mandrel, is such as to support the strip in place in the die, but without pressing thereagainst so as to produce undue frictional losses. The strip in passing about the mandrel and through the die, is thus formed into a helix the contiguous edges of which are interfolded in a manner as hereinbefore described, the die acting upon this helical structure in a manner similar to that of a nut upon a screw and, being itself unable to move on account of its abutment against the nut 4, the tube is continually forced off the end of the mandrel as long as the machine continues in operation. After passing off the end of the mandrel the tube passes over the rollers 61 and 62 which bear against the inside of the seam, supporting the same against the action of the rollers 59 and 60. It will be observed that the rollers 59, 60, 61 and 62 are set at such angles and have such longitudinal displacement as adapt them to the helical form and also the pitch of the tube being made. The spinning up of metal of the seam by the rollers as hereinbefore described results in a compacting and solidifying of the seam which renders the joint more permanent and reliable. Out of the rolls just referred to passes the completed, corrugated, flexible tube as shown in exterior at 119.

It will be observed that from the time the flat strip enters the former until it is finally formed into the tube there is no reverse bending but, on the contrary, the bending is continuous in one direction. In other words, a bend in the metal having been started it remains the same or else is increased in the same direction. The bending force is never reversed so as to straighten out a bend once made or cause a bend in the reverse direction. This avoidance of to and fro bending of the metal prevents fatigue thereof and the structure produced is stronger and more reliable.

While the invention has been illustrated by a method recited in detail and in connection with one form of apparatus by which it may be carried out, it may be utilized in connection with other forms of apparatus, and the details of the method may be varied without departing from its spirit. The invention is not therefore limited to the precise details of the method cited nor to practice with the apparatus shown.

What we claim is:

1. The method of forming a tube from a strip which consists in helically forming the strip, seaming the edges of adjacent convolutions and subjecting the metal of the seam to a metal body bearing thereon, the portion of said body contacting with said seam moving at a higher rate of speed than the part of the seam with which it contacts.

2. The method of forming a tube from a strip which consists in helically forming the strip, interfolding the edges of adjacent convolutions and subjecting the metal of the interfold parts to a metal body bearing thereon, the surface of said body contacting with said parts moving at a higher rate of speed than the surface with which it contacts.

3. The method of forming a flexible tube from a strip, which consists in forming a groove extending longitudinally of the strip, helically forming the strip and interfolding the edges of adjacent convolutions and subjecting the metal of the interfolded parts to a metal body bearing thereon, the surface of said body contacting with said parts moving at a higher rate of speed than the surface of said part with which it contacts.

4. The method of forming a flexible tube from a strip, which consists in forming a groove extending longitudinally of the strip, helically forming the strip and interfolding the edges of adjacent convolutions and subjecting the metal of the interfolded parts to a metal roller bearing thereon, the surface of said roller bearing upon said parts moving at a higher rate of speed than the surface of said parts with which it contacts.

5. The method of forming a corrugated tube from a corrugated strip which consists in helically forming the strip, forming a longitudinal groove therein independently of the interfolding of the edges of adjacent convolutions, and interfolding the edges of adjacent convolutions, the bending of the metal being always in one direction, to avoid fatigue of the metal.

6. The method of forming a flexible tube from a strip which consists in forming a longitudinal groove in the strip, helically coiling the strip independently of the interfolding of the edges of adjacent convolutions and interfolding the edges of adjacent convolutions, the tube being moved in a longitudinal direction during the coiling and interfolding.

7. The method of forming a flexible tube from a strip which consists in forming a longitudinal groove in the strip, helically coiling the strip independently of the interfolding of the edges of adjacent convolutions and interfolding the edges of adjacent convolutions, the tube being continuously moved in a longitudinal direction during the coiling and interfolding.

In testimony whereof we, FULTON and SHELLMER, have signed this specification this 20th day of October, 1919, and BRINKMAN the 20th day of November 1919.

WILLIAM H. FULTON.
HERMAN SHELLMER.
LOUIS H. BRINKMAN.